United States Patent [19]

Imai et al.

[11] 4,196,273

[45] Apr. 1, 1980

[54] CURABLE ORGANOPOLYSILOXANE COMPOSITIONS

[75] Inventors: Kiyoshi Imai; Masaki Tanaka, both of Annaka, Japan

[73] Assignee: Shin-Etsu Chemical Co. Ltd., Tokyo, Japan

[21] Appl. No.: 934,197

[22] Filed: Aug. 16, 1978

[30] Foreign Application Priority Data

Aug. 24, 1977 [JP] Japan ................................ 52-100643

[51] Int. Cl.$^2$ ............................................. C08G 77/06
[52] U.S. Cl. .................................. 528/15; 260/37 SB; 528/31; 528/32; 528/33; 528/34; 528/43; 428/429; 428/428; 428/447; 428/448
[58] Field of Search ...................... 528/15, 31, 32, 33, 528/34, 43; 260/37 SB

[56] References Cited

U.S. PATENT DOCUMENTS

| | | | |
|---|---|---|---|
| 3,814,731 | 6/1974 | Nitzsche et al. ......................... | 528/15 |
| 3,892,707 | 7/1975 | Itoh et al. ............................... | 528/15 |
| 4,045,390 | 8/1977 | Itoh et al. ............................... | 528/15 |
| 4,077,943 | 3/1978 | Sato et al. ............................... | 528/15 |

*Primary Examiner*—Melvyn I. Marquis
*Attorney, Agent, or Firm*—Toren, McGeady and Stanger

[57] ABSTRACT

The present invention presents a novel curable organopolysiloxane composition capable of being adhesively bonded firmly to the surface of various substrates with which it has been in contact during its curing by heating without the primer treatment of the surface. The composition is essentially composed of a diorganopolysiloxane terminated at both chain ends with vinyl groups as the base component, optionally, in combination of a copolymeric organopolysiloxane composed of vinyl-containing monofunctional siloxane units and tetrafunctional siloxane units $SiO_2$, an organohydrogenpolysiloxane having at least three silicon-bonded hydrogen atoms per molecule as a crosslinking agent by the addition reaction with the vinyl groups in the base component, a platinum catalyst to accelerate the above addition reaction and an alkoxy silane having an aliphatically unsaturated group which serves as a "self-bonding" improver in the composition with or without the addition of a filler.

7 Claims, No Drawings

CURABLE ORGANOPOLYSILOXANE COMPOSITIONS

BACKGROUND OF THE INVENTION

The present invention relates to a curable organopolysiloxane composition or, more particularly, to an organopolysiloxane composition which is readily curable by heating at a relatively moderate temperature and capable of giving adhesive bonding firmly to various substrate surfaces in contact with which the composition is cured.

In the prior art, there are known curable organopolysiloxane compositions in which crosslinking reaction proceeds by the mechanism of addition reaction between aliphatically unsaturated groups, in particular, vinyl groups, bonded directly to the silicon atoms and hydrogen atoms bonded directly to the silicon atoms. The organopolysiloxane compositions of this type have various advantages that they are curable within a short period of time by heating to be able to be used in a continuous process, that no undesirable by-products are formed during the reaction of curing, that shrinkage in curing is small, and further that the cured products thereof have excellent flame retardancy as well as good electric properties, so that the compositions are widely employed in various fields of application.

One of the defective features of the above mentioned-type curable organopolysiloxane compositions is, however, that no firm adhesive bonding can be obtained between the cured product thereof and the substrate surface with which the composition has been in contact during the reaction of curing. Such property may be desirable in some aspects, for example, in the applications such as the preparation of matrices for molding but is a fatal defect in the applications as an electrically insulating material by the techniques of molding, impregnation and the like.

It is a generally practiced means for the improvement of the adhesive bonding to a substrate surface that the substrate surface is treated in advance with a primer. The problems involved in the method of the primer treatment are the disadvantages in safety as well as in human health due to an organic solvent contained in the primer which itself is a solution in the organic solvent, the cost increase for the process of primer treatment as a natural consequence and the small versatility of the primer application in certain substrates due to possible danger or difficulty in the application of a primer depending on the shape and material of the substrate articles. See, for example, U.S. Pat. No. 3,527,655.

SUMMARY OF THE INVENTION

An object of the present invention is therefore to present a so-called "self-bonding" curable silicone rubber composition inherently possessing a property to be adhesively bonded by curing to the substrate surface with which it is in contact during curing.

The present invention relates to a curable organopolysiloxane composition essentially composed of (a) 100 parts by weight of a diorganopolysiloxane represented by the general formula

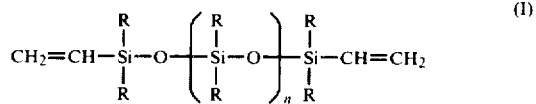

where R is a substituted or unsubstituted monovalent hydrocarbon group free of an aliphatically unsaturated linkage and n is a positive integer, (b) from 0 to 100 parts by weight of an organopolysiloxane expressed by the average unit formula

where the symbol R has the same meaning as defined above and u, v and w are the mole fractions of the respective siloxane units with the proviso that $(u+v)/w$ is in the range from 0.5 to 2.0 and $u+v+w=1$, the content of the vinyl groups being in the range from 0.5 to 3% by weight in the organopolysiloxane, (c) an organohydrogenpolysiloxane having at least three hydrogen atoms directly bonded to the silicon atoms in the molecule in an amount such that from 0.7 to 5.0 moles of the hydrogen atoms directly bonded to the silicon atoms are provided per mole of the vinyl groups in both of the above mentioned components (a) and (b), (d) from 0.1 to 5 parts by weight of an alkoxysilane having one or more aliphatically unsaturated groups, (e) from 0 to 500 parts by weight of a filler, and (f) a catalytic amount of platinum or a platinum compound.

DETAILED DESCRIPTION OF THE PREFERRED EMBODIMENTS

The component (a) used in the composition of the present invention is a diorganopolysiloxane having at least two vinyl groups in the molecule. Preferably, the diorganopolysiloxane has two vinyl groups at the chain terminals of the molecule as represented by the general formula (I) above, in which the group represented by the symbol R is a substituted or unsubstituted monovalent hydrocarbon group free of an aliphatically unsaturated linkage exemplified by alkyl groups such as methyl, ethyl and propyl groups, aryl groups such as phenyl and tolyl groups, cycloalkyl groups such as cyclohexyl and cycloheptyl groups and those groups obtained by replacing part of the hydrogen atoms in the above mentioned hydrocarbon groups with certain substituent atoms or groups such as halogen atoms and cyano groups. It is preferable that all of the groups represented by R in the molecule are methyl groups or at least 70 mole % of the groups R are methyl groups, the balance being phenyl groups.

The inclusion of phenyl groups is recommended when the composition as cured is intended to be used at a low temperature or higher radiation-resistance or higher refractive index of the composition is desired.

The symbol n in the formula stands for a positive integer with which the polymerization degree of the molecules is determined and it is preferable that the value of n in an average is such that the diorganopolysiloxane has a viscosity in the range from 50 to 1,000,000 centistokes or, preferably, from 100 to 100,000 centistokes at 25° C.

The component (b), which is an organopolysiloxane composed of three kinds of siloxane units as expressed by the average unit formula (II) above, is not always indispensable in the composition but the addition of this component is recommended when improvements in the flowability of the composition and the mechanical strengths of the cured products are desired. The organopolysiloxane of this type per se is known in the art and it is obtained as a cohydrolysis-condensation product or a product of rearrangement reaction of a mixture of three kinds of sources for respective three kinds of the siloxane units in the presence of a catalyst such as an acid. Taking a methyl group as the group represented by the symbol R, for example, (i) $(CH_2=CH)(CH_3)_2Si-O-Si(CH_3)_2(CH=CH_2)$ or $(CH_2=CH)(CH_3)_2SiCl$ as the starting material for the $(CH_2=CH)(R)_2SiO_{0.5}$ siloxane units, (ii) $(CH_3)_3Si-O-Si(CH_3)_3$ or $(CH_3)_3SiCl$ as the starting material for the $(R)_3SiO_{0.5}$ siloxane units and (iii) sodium silicate, alkyl silicates, polyalkyl silicates or silicon tetrachloride as the starting material for the $SiO_2$ siloxane units are taken in suitable proportions to meet the desired mole fractions expressed by the numbers u, v and w in the average unit formula and the mixture of these siloxanes or silanes is subjected to the cohydrolysis-condensation or the rearrangement reaction.

The properties of the organopolysiloxane as the component (b) can be widely varied depending on the proportions among three kinds of the siloxane units derived from the starting materials (i), (ii) and (iii) above. However, it is desirable in the present invention that the ratio $(u+v)/w$ is in the range from 0.5 to 2.0 and the content of the vinyl groups in the copolymeric organopolysiloxane is in the range from 0.5 to 3.0% by weight. These limitations are given in consideration of compatibility with the component (a), effect of reinforcement and effect on the improvement in the flowability of the composition as well as easiness in the preparation of the component.

In order to ensure the desired effects of the addition of the component (b) as described above such as an improvement in the mechanical strengths, it is recommended that from 10 to 50 parts by weight of the component (b) is formulated per 100 parts by weight of the component (a). Too much amount of the component (b) is not recommended, if not to mention increases in production cost, due to a loss in the rubbery elasticity of the cured composition, especially, when lower hardness or lower modulus is desired.

The organohydrogenopolysiloxane as the component (c) is indispensable in order to impart practically sufficient strengths to the cured products of the inventive composition which is cured by the crosslinking produced as a result of the addition reaction between the vinyl groups in the components (a) and (b) and the silicon-bonded hydrogen atoms in this component in the presence of a platinum catalyst as described below. The molecular structure of this organohydrogenpolysiloxane is not limitative insofar as it has at least three silicon-bonded hydrogen atoms in the molecule and various kinds of conventionally produced organohydrogenpolysiloxanes may be used as such including those having linear chain, branched chain or cyclic molecular structures. The organic groups bonded to the silicon atoms in this organohydrogenpolysiloxane are generally and preferably methyl groups, optionally, replaced in part with other hydrocarbon groups such as phenyl groups and alkyl groups other than methyl group.

The amount of the component (c) to be formulated in the inventive composition should naturally be sufficient to cure the composition by addition reaction functioning as a crosslinking agent and it is added usually in an amount such that from 0.7 to 5 moles or, preferably, from 1 to 2.5 moles of the silicon-bonded hydrogen atoms are provided per mole of the vinyl groups in the components (a) and (b).

The alkoxysilane containing an aliphatically unsaturated group as the component (d) is very important as contributing to the improvement of the self-bonding property of the inventive composition by curing as one of the major objects of the present invention. The alkoxysilane is represented by the general formula

$$(R^1)(R^2)_a Si(OR^3)_{3-a} \tag{III}$$

where $R^1$ is an organic group having at least one aliphatic double bond, $R^2$ is an alkyl group or an aryl group, $R^3$ is an alkyl group or an alkoxy-substituted alkyl group and a is 0, 1 or 2. The organic group $R^1$ having an aliphatic double bond is exemplified by alkenyl groups such as vinyl and allyl groups and 3-methacryloxypropyl group. Exemplary of the group $R^2$ are alkyl groups such as methyl, ethyl and propyl groups and aryl groups such as phenyl group and the group $R^3$ is exemplified by alkyl groups such as methyl, ethyl and propyl groups and alkoxy-substituted alkyl groups such as 2-methoxyethyl and 2-ethoxyethyl groups. These alkoxy-substituted alkyl groups are preferred to the alkyl groups when further improvement in the self-bonding is desired.

The examples of the above-described alkoxysilanes having aliphatic unsaturation are as follows. In the following and herein-after, methyl, ethyl, propyl and butyl groups are denoted by the symbols Me, Et, Pr and Bu, respectively.

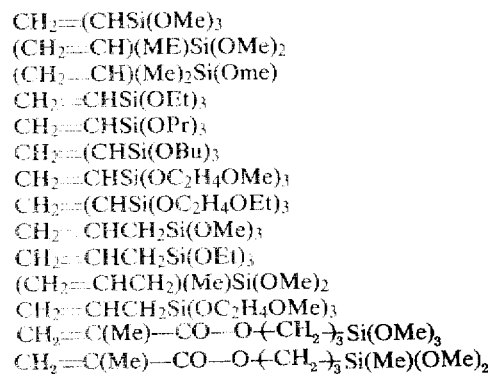

$CH_2=CHSi(OMe)_3$
$(CH_2=CH)(Me)Si(OMe)_2$
$(CH_2=CH)(Me)_2Si(OMe)$
$CH_2=CHSi(OEt)_3$
$CH_2=CHSi(OPr)_3$
$CH_2=CHSi(OBu)_3$
$CH_2=CHSi(OC_2H_4OMe)_3$
$CH_2=CHSi(OC_2H_4OEt)_3$
$CH_2=CHCH_2Si(OMe)_3$
$CH_2=CHCH_2Si(OEt)_3$
$(CH_2=CHCH_2)(Me)Si(OMe)_2$
$CH_2=CHCH_2Si(OC_2H_4OMe)_3$
$CH_2=C(Me)-CO-O+CH_2)_3Si(OMe)_3$
$CH_2=C(Me)-CO-O+CH_2)_3Si(Me)(OMe)_2$

These silane compounds as the component (d) as the self-bonding improver are added to the inventive composition in an amount from 0.1 to 5 parts by weight or, preferably, from 0.5 to 3 parts by weight per 100 parts by weight of the component (a). Any smaller amount of the component (d) naturally cannot give sufficient effects on the improvement of self-bonding while any larger amounts result in poorer properties, e.g. mechanical strengths of the cured products.

The filler as the component (e) is added according to need when improvements in the mechanical strengths, thermal conductivity and flame retardancy of the cured products are desired. Several of the examples suitable for the purpose are fumed silica, precipitated silica, aluminum silicate, quartz powder, powder of fused quartz, diatomaceous earth, calcium carbonate, titanium dioxide, carbon black and the like. It is optional that these fillers are admixed with iron oxide, zinc oxide, magnesium carbonate and the like. The amount of the filler as the component (e) is limited to 500 parts by weight or less per 100 parts by weight of the component (a), because larger amounts of the filler result in poorer flowability of the composition and brittleness of the cured products.

The component (f) which is platinum or a platinum compound is a catalyst to accelerate the addition reaction between the vinyl groups in the components (a) and (b) and the silicon-bonded hydrogen atoms in the component (c), and exemplified by platinum black, chloroplatinic acid, complexes of chloroplatinic acid with an olefin or an aldehyde and chloroplatinic acid modified with an alcohol. The amount of this component is subject to adjustment according to the desired velocity of curing but it is usually within the range from about 0.1 to about 50 p.p.m. by weight calculated as platinum based on the amount of the component (a).

It is further optional that various kinds of known additives may be admixed according to specific needs, including a silicone fluid of relatively low molecular weight which serves to decrease the viscosity of the composition as well as to decrease the modulus of the cured products, heat stability improvers, flame retardants, reaction retarders and the like.

The curable organopolysiloxane composition of the present invention is prepared by merly blending the components abovedescribed uniformly, and may have a consistency ranging from an easily flowable fluid to a non-flowable putty-like mass depending on the nature of the individual components and blending ratios. In accordance with the consistency of the composition, the compositions are put to use by molding, impregnating, filling, coating and other means.

The compositions are curable by heating at a relatively low or moderate temperature of, for example, from 50° to 200° C. or, preferably, 80° to 200° C. within a short period of time, say, from 10 minutes to 16 hours depending on the formulation of the composition and the curing temperature and become adhesively bonded to various substrate surfaces with which the compositions have been in contact during the curing. The adhesive bonding thus obtained is very strong so that the compositions are widely employed in various fields of application as a sealing material for high-voltage circuits in television sets, adhesive for necks of Braun tubes, molding material for coil insulation, sealing material for the terminals of lead wires in electric circuits, moisture-proofing or insulating material for printed circuits, adhesive for flexible laminated boards, crushing inhibitor or adhesive for multi-ply glass wares such as Braun tubes, sealing material for medical instruments and high-temperature adhesives as well as for the manufacture of rubber-lined cloths, belts and the like.

Following are the examples to further illustrate the present invention in detail, in which parts are all parts by weight.

EXAMPLE 1

Into a base mixture prepared by blending 100 parts of a dimethylpolysiloxane terminated at both chain ends with vinyldimethylsilyl groups and having a viscosity of about 1,000 centistokes at 25° C., 5 parts of a methylhydrogenpolysiloxane expressed by the formula

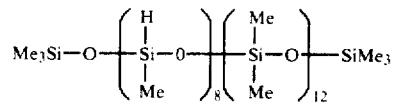

and 1 part of an isopropyl alcohol solution of chloroplatinic acid in a concentration of 5% as platinum was admixed 1.0 part of one of the silane compounds indicated in Table I to give a curable organopolysiloxane composition of the present invention.

Table I

| Exp. No. | Silane compound | Curing schedule | |
|---|---|---|---|
| | | at 100° C. for 120 mins. | at 120° C. for 60 mins. |
| 1 | None | C | C |
| 2 | Vinyltrimethoxysilane | A | A |
| 3 | Vinyltriethoxysilane | B | A |
| 4 | Vinyltri(2-methoxyethoxy)silane | A | A |
| 5 | Allytrimethoxysilane | A | A |
| 6 | Vinylmethyldimethoxysilane | B | A |
| 7 | 3-Methacryloxypropyltrimethoxysilane | A | A |
| 8 | Methyltrimethoxysilane | C | C |

The composition thus prepared was sandwiched between two glass plates and subjected to curing as such by heating at 100° C. for 120 minutes or at 120° C. for 60 minutes and the adhesive bonding of the glass plates by the cured composition was examined to give the results as set out in the table. Experiments No. 1 and No. 8 in the table are for comparative purpose. The results of the adhesive strength were recorded in three grades A, B and C by the following standards.

A: very firm adhesive bonding by curing
B: adhesively bonded but somewhat weak in strength
C: not bonded adhesively

EXAMPLE 2

Vinyltrimethoxysilane was admixed to the same base mixture as prepared in Example 1 in varied amounts as indicated in Table 2 below ranging from 0.1 to 5.0 parts. The test for adhesive bonding was conducted in the same manner as in Example 1 with the same curing schedules, i.e. at 100° C. for 120 minutes or at 120° C. for 60 minutes. The results of the test are set out in Table II.

Table II

| Exp. No. | Amount of addition, parts by weight | Curing schedule | |
|---|---|---|---|
| | | at 100° C. for 120 mins. | at 120° C. for 60 mins. |
| 9 | 0.1 | B | B |
| 10 | 0.5 | A | A |
| 2* | 1.0 | A | A |
| 11 | 3.0 | A | A |
| 12 | 5.0 | A | A |

*Given Example 1.

EXAMPLE 3

A curable composition was prepared by blending 100 parts of a dimethylpolysiloxane terminated at both chain ends with vinyldimethylsilyl groups and having a viscosity of about 600 centistokes at 25° C., 8 parts of a methylhydrogenpolysiloxane expressed by the formula

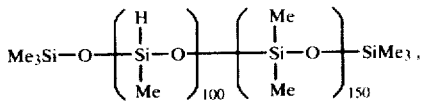

100 parts of powdered quartz with an average particle size of about 5 μm, 2 parts of the same 3-methacryloxypropyl trimethoxysilane as used in Experiment No. 7 of Example 1 and 0.1 part of an isopropyl alcohol solution of chloroplatinic acid in a concentration of 5% as platinum. The thus prepared composition was subjected to curing by heating at 100° C. for 2 hours as applied to the surfaces of various materials including glass, aluminum, soft steel, stainless steel, epoxy resin and phenolic resin (Experiments No. 13 to No. 18) to find that the adhesive bonding was very firm with shearing adhesive strengths of 11.0, 11.2, 9.5, 7.0, 10.8 and 11.5 kg/cm², respectively. The mechanical properties of the cured composition were: tensile strength 35 kg/cm², ultimate elongation 150% and tear strength 6 kg/cm.

EXAMPLE 4

A curable composition was prepared by blending 90 parts of a dimethylpolysiloxane terminated at both chain ends with vinyldimethylsilyl groups and having a viscosity of about 5,000 centistokes at 25° C., 10 parts of a copolymeric organopolysiloxane composed of three siloxane units, i.e. $(ME)_2(CH_2=CH)SiO_{0.5}$, $Me_3SiO_{0.5}$ and $SiO_2$, the molar ratio of the sum of the first and the second siloxane units to the third siloxane units being 1.0 and the content of vinyl groups being 1.0% by weight, 5 parts of the same methylhydrogenpolysiloxane as used in Example 1, 20 parts of fumed silica surface-treated with trimethychlorosilane and having a specific surface area of about 200 m²/g, 0.1 part of an isopropyl alcohol solution of chloroplatinic acid in a concentration of 5% as platinum and 2 parts of vinyltrimethoxysilane. The thus prepared composition was examined for adhesive bonding by curing to the various materials used in Experiments No. 13 to No. 18 in Example 3 to find that the adhesive bonding was excellent with shearing adhesive strengths of 23.0, 18.5, 19.2, 17.8, 21.5 and 21.0 kg/cm² for glass, aluminum, soft steel, stainless steel, epoxy resin and phenolic resin, respectively. The mechanical properties of the cured composition were: tensile strength 45 kg/cm², ultimate elongation 300% and tear strength 18 kg/cm.

EXAMPLE 5

A curable composition was prepared by uniformly blending 75 parts of a dimethylpolysiloxane terminated at both chain ends with vinyldimethylsilyl groups and having a viscosity of about 80,000 centistokes at 25° C., 25 parts of the same copolymeric organopolysiloxane as used in Example 4, 50 parts of a quartz powder with an average particle diameter of about 5 μm, 0.1 part of the same solution of chloroplatinic acid as used in Example 4, 6 parts of an organopolysiloxane with silicon-bonded hydrogen atoms composed of $SiO_2$ siloxane units and $Me_2HSiO_{0.5}$ siloxane units in a molar ratio of 1:2, and 2 parts of 3-methacryloxypropyl trimethoxysilane.

The thus obtained composition was applied on to a test panel of glass, aluminum or an epoxy resin and cured by heating at 120° C. for 2 hours to give excellent adhesive bonding.

What is claimed is:

1. A curable organopolysiloxane composition consisting essentially of (a) 100 parts by weight of a diorganopolysiloxane having at least two vinyl groups in the molecule, the organic groups other than the vinyl groups being substituted or unsubstituted monovalent hydrocarbon groups free of aliphatic unsaturation,
   (b) from 0 to 100 parts by weight of an organopolysiloxane expressed by the average unit formula

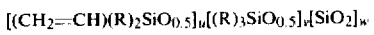

where the symbol R is a substituted or unsubstituted monovalent hydrocarbon groups free of aliphatic unsaturation and u, v and w are the mole fractions of the respective siloxane units with the proviso that (u+v)/w is in the range from 0.5 to 2.0 and u+v+w=1, the content of the vinyl groups being in the range from 0.5 to 3% by weight,
   (c) an organohydrogenpolysiloxane having at least three hydrogen atoms directly bonded to the silicon atoms in the molecule in an amount such that from 0.7 to 5 moles of the hydrogen atoms directly bonded to the silicon atoms are provided per mole of the vinyl groups in the components (a) and (b),
   (d) from 0.1 to 5 parts by weight of an alkoxy silane having an aliphatically unsaturated group,
   (e) from 0 to 500 parts by weight of a filler, and
   (f) a catalytic amount of platinum or a platinum compound.

2. The curable organopolysiloxane composition as claimed in claim 1 wherein the diorganopolysiloxane as the component (a) is represented by the general formula

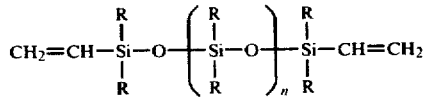

where R is a substituted or unsubstituted monovalent hydrocarbon group free of aliphatic unsaturation and n is a positive integer.

3. The curable organopolysiloxane composition as claimed in claim 1 wherein the alkoxy silane having an aliphatically unsaturated group is represented by the general formula

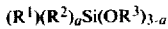

where $R^1$ is an organic group having at least one aliphatically unsaturated linkage, $R^2$ is an alkyl or an aryl group, $R^3$ is an alkyl group or an alkoxy-substituted alkyl group and a is 0, 1 or 2.

4. The curable organopolysiloxane composition as claimed in claim 1 wherein at least 70 mole % of the organic groups other than the vinyl groups in the component (a) consists of methyl groups, the remaining consisting of phenyl groups.

5. The curable organopolysiloxane composition as claimed in claim 1 wherein the component (a) has a viscosity in the range from 50 to 1,000,000 centistockes at 25° C.

6. The curable organopolysiloxane composition as claimed in claim 1 wherein the amount of the component (b) is in the range from 10 to 50 parts by weight per 100 parts by weight of the component (a).

7. The curable organopolysiloxane composition as claimed in claim 1 wherein the aliphatically unsaturated group in the component (d) is selected from the class consisting of vinyl, allyl and 3-methacryloxypropyl groups.

* * * * *